United States Patent
Lewis et al.

(10) Patent No.: US 9,499,202 B2
(45) Date of Patent: Nov. 22, 2016

(54) STEERING SYSTEM AND METHOD FOR AUTONOMOUS VEHICLES

(71) Applicant: DELPHI TECHNOLOGIES, INC., Troy, MI (US)

(72) Inventors: Matthew J. Lewis, Mountain View, CA (US); Michael H. Laur, Mission Viejo, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/687,375

(22) Filed: Apr. 15, 2015

(65) Prior Publication Data

US 2016/0304123 A1    Oct. 20, 2016

(51) Int. Cl.
| | |
|---|---|
| B62D 5/04 | (2006.01) |
| B62D 15/02 | (2006.01) |
| B62D 3/12 | (2006.01) |
| G05D 1/02 | (2006.01) |

(52) U.S. Cl.
CPC ............... *B62D 15/025* (2013.01); *B62D 3/12* (2013.01); *B62D 5/0421* (2013.01); *B62D 5/0463* (2013.01); *B62D 5/0478* (2013.01); *G05D 1/0278* (2013.01)

(58) Field of Classification Search
CPC .... B62D 1/286; B62D 15/025; B62D 5/008; B62D 15/0255; B62D 15/0285
See application file for complete search history.

(56) References Cited

U.S. PATENT DOCUMENTS

| | | | |
|---|---|---|---|
| 5,598,908 A | 2/1997 | York et al. | |
| 6,450,286 B1 | 9/2002 | Rui et al. | |
| 6,454,044 B1 | 9/2002 | Menjak et al. | |
| 6,817,437 B2 * | 11/2004 | Magnus | B62D 5/006 180/403 |
| 7,278,512 B2 | 10/2007 | Kodama et al. | |
| 7,306,535 B2 | 12/2007 | Menjak et al. | |
| 7,510,038 B2 * | 3/2009 | Kaufmann | B62D 1/286 180/167 |
| 7,530,422 B2 * | 5/2009 | Bolourchi | B62D 5/008 180/406 |
| 7,894,951 B2 * | 2/2011 | Norris | G05D 1/0246 180/443 |
| 8,002,075 B2 | 8/2011 | Markfort | |
| 8,150,582 B2 | 4/2012 | Blommer et al. | |
| 8,762,006 B2 | 6/2014 | Miller | |
| 8,994,521 B2 * | 3/2015 | Gazit | B62D 1/28 340/425.5 |
| 2002/0169531 A1 | 11/2002 | Kawazoe et al. | |
| 2004/0262063 A1 | 12/2004 | Kaufmann et al. | |
| 2005/0188690 A1 | 9/2005 | Namuduri et al. | |
| 2006/0213320 A1 * | 9/2006 | Menjak | B62D 5/008 74/640 |
| 2008/0141814 A1 | 6/2008 | Markfort | |
| 2013/0002416 A1 | 1/2013 | Gazit | |
| 2013/0060414 A1 * | 3/2013 | Lee | B62D 1/286 701/23 |
| 2014/0277896 A1 | 9/2014 | Lathrop et al. | |
| 2016/0075369 A1 * | 3/2016 | Lavoie | B62D 15/0285 180/446 |

\* cited by examiner

*Primary Examiner* — Kevin Hurley
(74) *Attorney, Agent, or Firm* — Joshua M. Haines

(57) ABSTRACT

A steering system for an autonomous vehicle includes a steering mechanism having a pinion gear and a rack, the steering mechanism being configured to translate rotation of the pinion gear into movement of the rack which is configured to affect the position of a steer tire of the autonomous vehicle, thereby affecting the lateral position of the autonomous vehicle; a steering wheel which provides a mechanical input to the pinion gear from an operator of the autonomous vehicle; a steering actuator which rotates to apply torque to the steering mechanism, thereby inducing movement of the rack which affects the position of the steer tire of the autonomous vehicle; and a variable coupling member operatively between the steering actuator and the steering mechanism which is configured to vary the torque that can be transmitted from the steering actuator to the steering mechanism.

16 Claims, 4 Drawing Sheets

STEERING SYSTEM AND METHOD FOR AUTONOMOUS VEHICLES

TECHNICAL FIELD OF INVENTION

The present invention generally relates to autonomous vehicles and more particularly to a steering system for autonomous vehicles, including methods for operating the steering system.

BACKGROUND OF INVENTION

Autonomous vehicles and vehicles that include advanced driver assistance systems include steering systems which are responsible for steering, i.e. laterally positioning, the vehicle without physical input from an operator of the automobile during at least some modes of operation of the vehicle. The steering systems of such vehicles include and actuator, for example an electric motor, which positions a steering mechanism, for example, a rack and pinion steering gear which positions steer tires of the vehicle to alter the lateral position or direction of the vehicle. However, it may be desirable for such vehicles to maintain a customary steering input, i.e. a steering wheel, for the operator to steer the vehicle in a conventional manner in some circumstances. When the steering actuator is solely responsible for steering the vehicle, it is common for the steering wheel to be back-driven, i.e. the steering wheel rotates without input from the operator of the motor vehicle due to a mechanical link between the steering mechanism and the steering wheel. While the steering wheel being back-driven may note pose a problem in modes of operation where the rate of rotation and the magnitude of angular movement of the steering wheel caused by the steering actuator is relatively low, for example when the vehicle is navigating a route on a roadway, a risk may be present in a mode of operation where the rate of rotation and the magnitude of angular movement of the steering wheel caused by the steering actuator is relatively high, for example during a parking maneuver or during an evasive maneuver. U.S. Pat. No. 8,002,075 to Markfort discloses a steering system that may be used in an autonomous vehicle. The steering system of Markfort includes a clutch between the steering wheel and the steering mechanism which allows the steering wheel to be decoupled from the steering mechanism during autonomous operation and to be coupled from the steering mechanism outside of autonomous operation. While the steering system of Markfort may eliminate the risk of the operator of the vehicle coming into contact with the steering wheel which is being rotated at a high rate or being rotated through a large angular displacement during autonomous operation, the steering system of Markfort assumes only two operational states are needed, i.e. autonomous and manual. However, it may be desirable for the steering system to have greater flexibility based on the particular driving situation that is encountered.

What is needed is a steering system for an autonomous vehicle which minimizes or eliminates one or more the shortcomings as set forth above.

SUMMARY OF THE INVENTION

Briefly described, a steering system is provided for an autonomous vehicle where the steering system includes a steering mechanism having a steering mechanism input member and a steering mechanism output member, the steering mechanism being configured to translate rotation of the steering mechanism input member into movement of the steering mechanism output member which is configured to affect the position of a steer tire of the autonomous vehicle, thereby affecting the lateral position of the autonomous vehicle; a steering wheel which provides a mechanical input to the steering mechanism input member from an operator of the autonomous vehicle; a steering actuator which rotates to apply torque to the steering mechanism, thereby inducing movement of the steering mechanism output member which affects the position of the steer tire of the autonomous vehicle; and a variable coupling member operatively between the steering actuator and the steering mechanism which is configured to vary the torque that can be transmitted from the steering actuator to the steering mechanism.

A method is also provided for operating a steering system for an autonomous vehicle where the steering system includes a steering mechanism having a steering mechanism input member and a steering mechanism output member, the steering mechanism being configured to translate rotation of the steering mechanism input member into movement of the steering mechanism output member which is configured to affect the position of a steer tire of the autonomous vehicle, thereby affecting the lateral position of the autonomous vehicle; a steering wheel which provides a mechanical input to the steering mechanism input member from an operator of the autonomous vehicle; a steering actuator which rotates to apply torque to the steering mechanism, thereby inducing movement of the steering mechanism output member which affects the position of the steer tire of the autonomous vehicle; and a variable coupling member operatively between the steering actuator and the steering mechanism. The method includes adjusting the variable coupling member to vary the torque that can be transmitted from the steering actuator to the steering mechanism.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
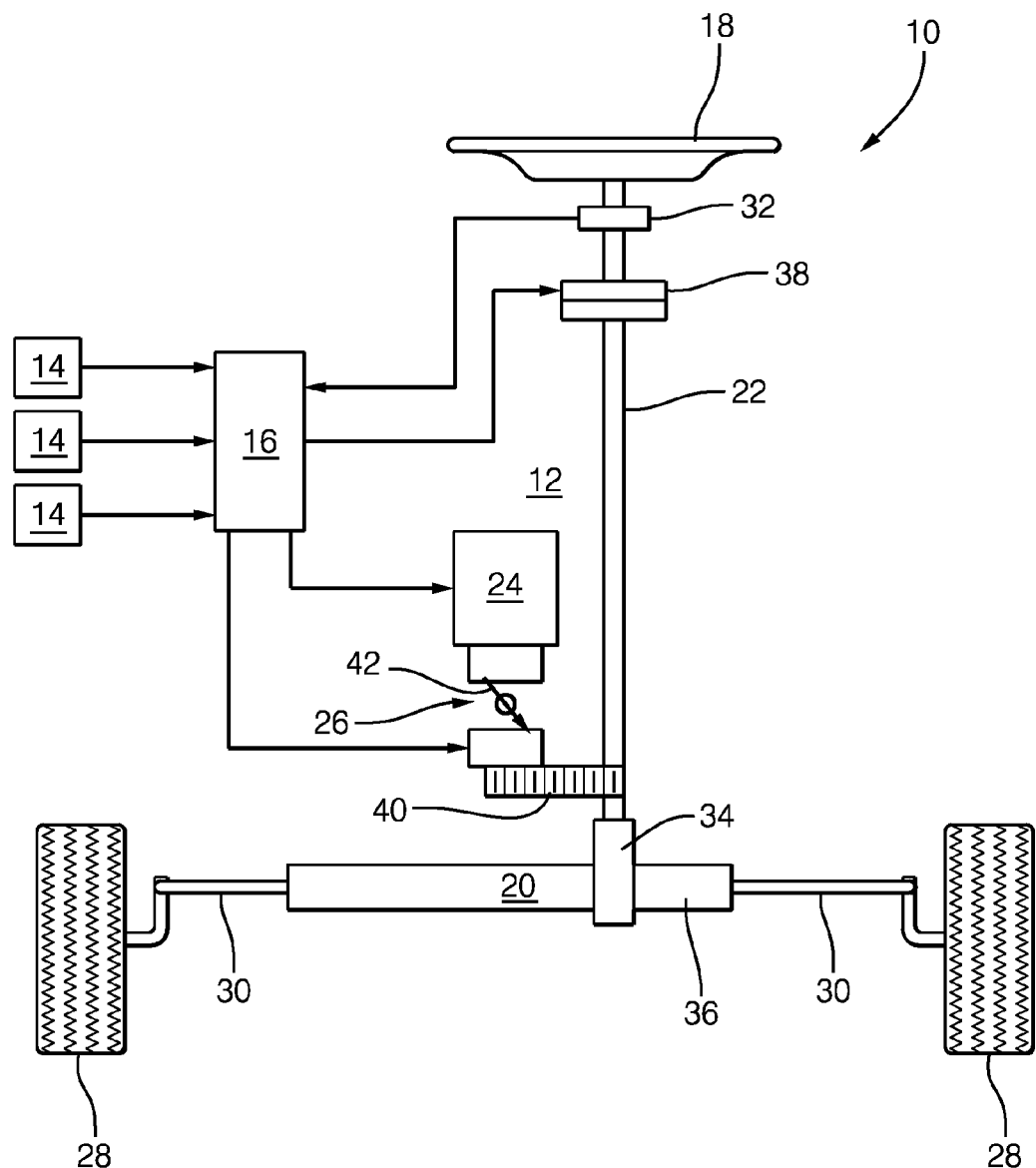
FIG. 1 is a schematic view of a steering system for an autonomous vehicle in accordance with the present invention.

In accordance with a preferred embodiment of this invention and referring to FIG. 1, a steering system 10 is shown which is responsible for steering, i.e. laterally positioning, an autonomous vehicle 12. Propulsion of autonomous vehicle 12 may be provided by one or more know methods of propulsion, which may be, by way of non-limiting example only, an internal combustion engine, a fuel cell system, an electric motor supplied with electricity stored in a battery, and combinations of one or more thereof. Autonomous vehicle 12 includes a plurality of input devices 14 which sense and provide information about the surroundings of autonomous vehicle 12, sense the current operational state of autonomous vehicle 12, and provide information about the anticipated and desired operational state of autonomous vehicle 12, and may be, by way of non-limiting example only, cameras, radar, lidar, GPS, speed sensors, a compass, maps, wireless communication, sensors for monitoring the operational state of an internal combustion engine (not shown), battery-state sensors, operator-state sensors, or commanded operator inputs. Input devices 14 communicate respective data to an autonomous driving electronic control unit (ECU) 16 which processes the data in order to control the speed and direction of autonomous vehicle 12 by interacting with systems which control throttle and braking, i.e. longitudinal positioning, and also by interacting with steering system 10 to affect lateral positioning. It can be generalized that input devices 14 communicate navigational input data to autonomous driving ECU 16 which processes the navigational input data in order to provide navigational output data to throttle and braking systems and also in order to provide navigational output data to steering system 10. While autonomous driving ECU 16 has been illustrated as a single integrated unit, it should now be understood that autonomous driving ECU 16 could alternatively be several units that are dedicated to individual systems and communicate with each other. Autonomous vehicle 12 may be configured to operate in an autonomous mode where autonomous vehicle 12 may navigate a route with no input from an operator of autonomous vehicle 12, i.e. autonomous driving ECU 16 controls both the longitudinal and lateral directions of autonomous vehicle 12. As used herein, the term operator refers to the individual that is responsible for controlling the manual aspects of autonomous vehicle 12 and is the equivalent of a driver in a conventional motor vehicle. Autonomous vehicle 12 may also be configured to operate in a manual mode where autonomous vehicle 12 navigates a route based on input from the operator of autonomous vehicle 12, i.e. the operator controls the longitudinal direction of autonomous vehicle 12 through conventional throttle and braking controls (not shown) and the operator also controls the lateral direction of autonomous vehicle 12 through a steering wheel 18 of steering system 10.

Steering system 10 will now be described in greater detail with continued reference to FIG. 1. In addition to steering wheel 18, steering system 10 generally includes a steering mechanism illustrated as rack and pinion steering gear 20, a steering shaft 22 which connects steering wheel 18 to rack and pinion steering gear 20 as will be described in greater detail later, a steering actuator 24 which actuates rack and pinion steering gear 20, a variable coupling member 26 between steering actuator 24 and rack and pinion steering gear 20, steer tires 28, and tie rods 30 which connect rack and pinion steering gear 20 to steer tires 28. A torque sensor 32 may be provided which senses torque that is applied to steering wheel 18 by the operator of autonomous vehicle 12 and generates a signal indicative of the torque applied to steering wheel 18 such that the signal is transmitted to autonomous driving ECU 16. The elements which comprise steering system 10 will be described in greater detail in the paragraphs that follow. While autonomous vehicle 12 has been illustrated as having two steering tires 28, it should now be understood that a great or lesser number of steer tires 28 may be provided.

Rack and pinion steering gear 20 includes a steering mechanism input member illustrated as pinion gear 34 and a steering mechanism output member illustrated as rack 36. Pinion gear 34 includes pinion teeth (not shown) which mesh with complementary rack teeth (not shown) of rack 36, and consequently, rotation of pinion gear 34 causes rack 36 to move linearly. A respective tie rod 30 is attached to each end of rack 36, and consequently linear movement of rack 36 affects the position of steer tires 28, thereby affecting the lateral position of autonomous vehicle 12. Steering wheel 18 provides a mechanical input to pinion gear 34 from the operator of autonomous vehicle 12, however, a means for selectively coupling and decoupling steering wheel 18 from pinion gear 34 is provided where the means for selectively coupling and decoupling steering wheel 18 from pinion gear 34 is illustrated as clutch 38. Clutch 38 may be, by way of non-limiting example only, an electric clutch which is engaged and disengaged by command of autonomous driving ECU 16. Consequently, when clutch 38 is engaged, a mechanical link is provided from steering wheel 18 to pinion gear 34, thereby coupling steering wheel 18 to pinion gear 34. Conversely, when clutch 38 is disengaged, steering wheel 18 is no longer mechanically connected to pinion gear 34, thereby decoupling steering wheel 18 from pinion gear 34. Clutch 38 is preferably configured to default to be engaged, thereby coupling steering wheel 18 to pinion gear 34 by default.

Steering actuator 24 is configured to rotate and apply torque to rack and pinion steering gear 20 thereby inducing movement of rack 36 which positions steer tires 28. As embodied herein, steering actuator 24 may be an electric motor which rotates based on input from autonomous driving ECU 16. Steering actuator 24 may directly rotate variable coupling member 26 or may rotate variable coupling member 26 through a gear set. Also as embodied herein, rotation and torque generated by steering actuator 24 may be transferred to pinion gear 34 through a drive member 40 which may be, by way of non-limiting example only, a belt, chain, or gear set that is connected to variable coupling member 26 and steering shaft 22. Consequently, rotation of steering actuator 24 based on command by autonomous driving ECU 16 causes pinion gear 34 to be rotated via variable coupling member 26 and drive member 40, thereby inducing movement of rack 36 which positions steer tires 28. In a first alternative arrangement, steering actuator 24 may surround steering shaft 22, thereby eliminating the need for a belt or chain. One such arrangement is shown in U.S. Pat. No. 7,306,535 to Menjak et al., the disclosure of which is incorporated herein by reference in its entirety. When steering actuator 24 surrounds steering shaft 22, variable coupling member 26 may also surround steering shaft 22. In a second alternative arrangement, steering actuator 24 may position rack 36 without working through pinion gear 34. One such arrangement where a steering actuator positions a rack without working through the pinion gear is described in U.S. Pat. No. 6,454,044 to Menjak et al., the disclosure of which is incorporated herein by reference in its entirety. As disclosed in Menjak et al., the rack may include a ball screw which interacts with a ball nut that is rotated by a steering actuator. Consequently, rotation of the steering actuator induces movement of the rack, thereby positioning the steer tires.

Variable coupling member 26 is located operatively between steering actuator 24 and rack and pinion steering gear 20 and is configured to vary the magnitude of torque that is permitted to be transmitted from steering actuator 24 to rack and pinion steering gear 20. As used herein, varying the magnitude of torque that is permitted to be transmitted from steering actuator 24 to rack and pinion steering gear 20 means adjusting variable coupling member 26 to permit all of the torque from steering actuator 24, none of the torque from steering actuator 24, or any desired fraction of the torque from steering actuator 24 to be transmitted to rack and pinion steering gear 20. A torque transfer arrow 42 is shown as being variable in nature in FIG. 1 to illustrate that the magnitude of torque that is permitted to be transmitted from steering actuator 24 to rack and pinion steering gear 20 can be varied. Variable coupling member 26 may be as shown, by way of non-limiting example only, a magnetorheological fluid coupling, an example of which is described in U.S. Pat. No. 5,598,908 to York et al., the disclosure of which is incorporated herein by reference in its entirety. In a magnetorheological fluid coupling, an input member and an output member are coupled together in a variable manner by magnetorheological fluid which has a controllable yield strength in shear based on a variable magnetic field applied thereto. Consequently, the magnetic field can be adjusted based on input from autonomous driving ECU 16 to provide a desired magnitude of torque that permitted to be transferred from steering actuator 24 to steering shaft 22, the significance of which will be made more readily apparent later. By including variable coupling member 26, steering system 10 is able to be adapted to various manual and autonomous driving situations as will be described in the following paragraphs which describe methods for operating steering system 10.

Figure 2:
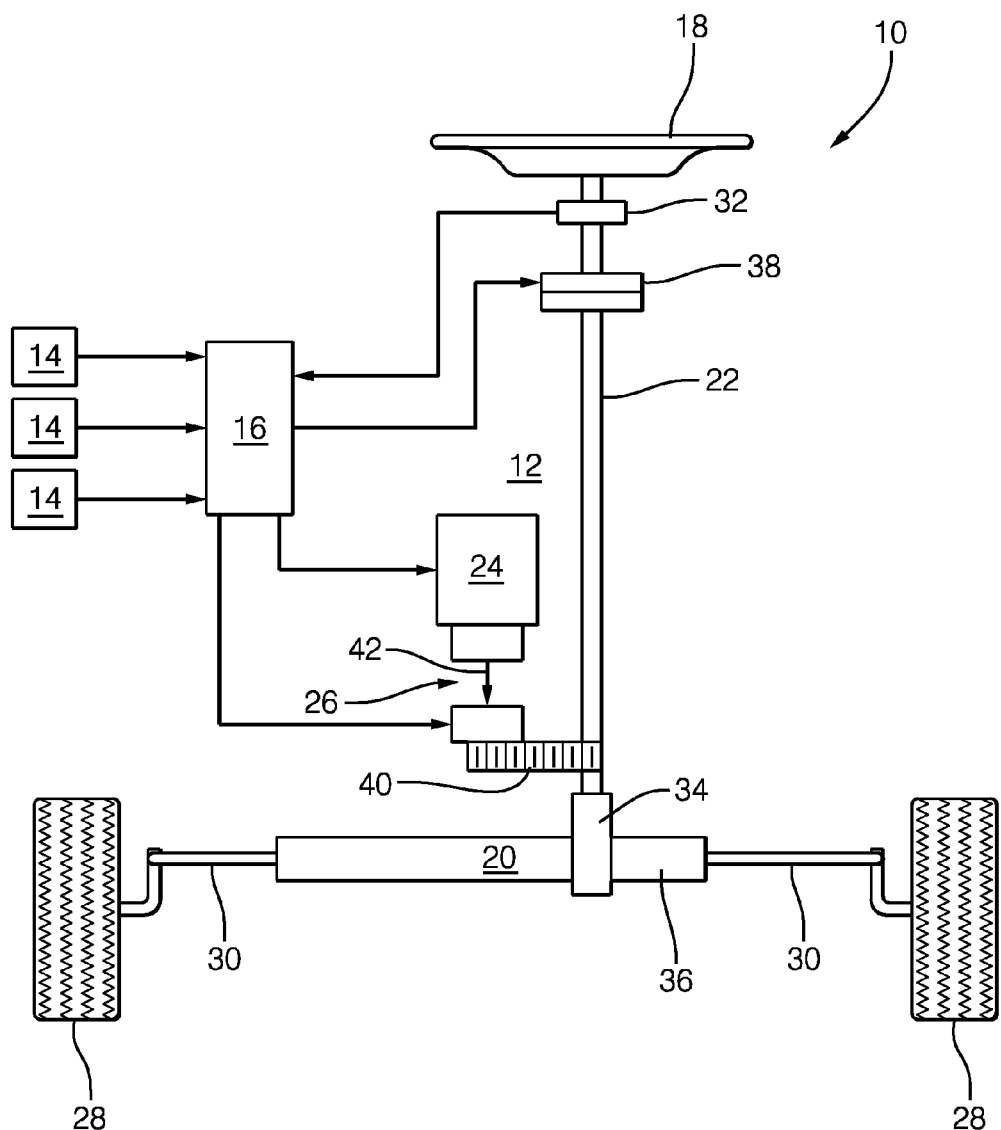
FIG. 2 is the schematic view of FIG. 1 showing the steering system in a manual mode of operation.

Now with reference to FIG. 2, a manual mode of operation of steering system 10 is shown where the operator of autonomous vehicle 12 is solely responsible for steering, i.e. laterally positioning, autonomous vehicle 12. The manual mode of operation may be initiated by the operator of autonomous vehicle 12, by way of non-limiting example only, by pushing a button, activating a switch, manually applying brakes of autonomous vehicle 12, or performing any other operation that autonomous driving ECU 16 has been programmed to recognize as the operator's desire to enter the manual mode of operation when autonomous driving ECU 16 determines that it is safe, based on input from input devices 14, to transition to manual mode of operation. The manual mode of operation may also be initiated by autonomous driving ECU 16, by way of non-limiting example only, when autonomous driving ECU 16 makes a determination that autonomous driving ECU 16 is no longer capable of steering autonomous vehicle 12 which may be due to, also by way of non-limiting example only, failure of one or more of input devices 14, insufficient input from one or more of input devices 14, failure of steering actuator 24, or failure of variable coupling member 26. If autonomous driving ECU 16 initiates the manual mode of operation, the operator of autonomous vehicle 12 may be alerted by an audible and/or visual warning. In the manual mode of operation, autonomous driving ECU 16 commands clutch 38 to be engaged, thereby rotationally coupling steering wheel 18 to pinion gear 34. Also in the manual mode of operation, autonomous driving ECU 16 commands steering actuator 24 to provide assistance to pinion gear 34 based on input from torque sensor 32, thereby reducing the effort required from the operator of autonomous vehicle 12 to perform a steering maneuver, which is particularly needed when autonomous vehicle 12 has low or zero longitudinal speed which increase the force required to turn steer tires 28. Also in the manual mode of operation, autonomous driving ECU 16 commands variable coupling member 26 to be capable of transmitting a magnitude of torque from steering actuator 24 to pinion gear 34 without slippage occurring within variable coupling member 26. FIG. 2 includes a single torque transfer arrow 42 to illustrate this capability of transferring this magnitude of torque through variable coupling member 26. However, in the event of failure of steering actuator 24 or variable coupling member 26, steering wheel 18 is able to provide the entire input to move rack 36 through pinion gear 34, although with increased effort to the operator of autonomous vehicle 12.

Figure 3:
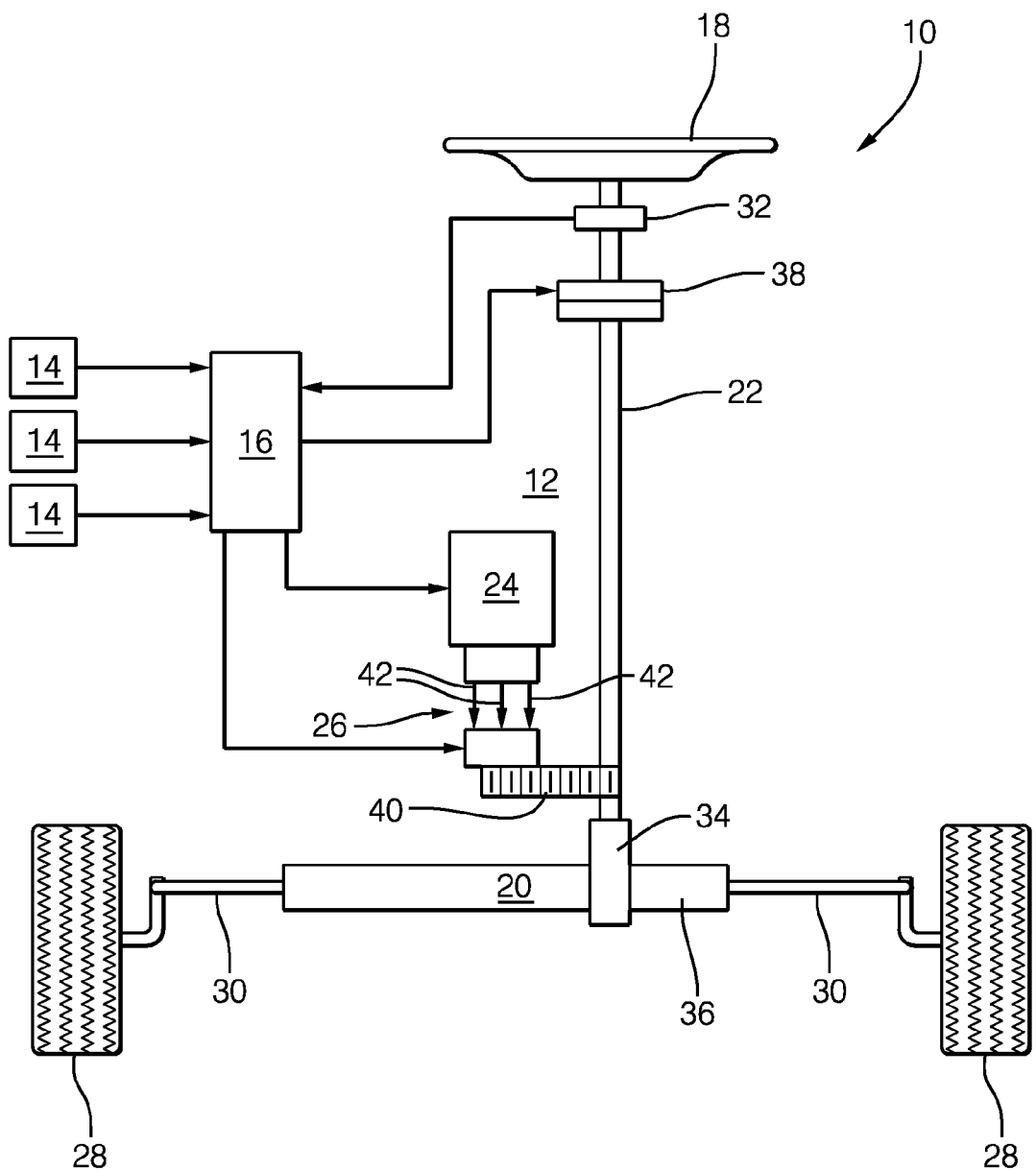
FIG. 3 is the schematic view of FIG. 1 showing the steering system in a first autonomous mode of operation.

Now with reference to FIG. 3, a first autonomous mode of operation of steering system 10 is shown. In the first autonomous mode of operation, autonomous driving ECU 16 is primarily responsible for steering autonomous vehicle 12 where the rate of rotation of steering shaft 22, the magnitude of angular movement of steering shaft 22, and the torque required from steering actuator 24 to position rack 36 is relatively low. This condition may exist, by way of non-limited example only, when autonomous vehicle 12 is being operated by autonomous driving ECU 16 to navigate a roadway or assist in high volume traffic scenarios. In the first autonomous mode of operation, autonomous driving ECU 16 commands clutch 38 to be engaged, thereby rotationally coupling steering wheel 18 to pinion gear 34. Also in the first autonomous mode of operation, autonomous driving ECU 16 commands steering actuator 24 to position rack 36 as determined necessary by autonomous driving ECU 16 based on input devices 14. Also in the first autonomous mode of operation, autonomous driving ECU 16 commands variable coupling member 26 to be capable of transmitting a magnitude of torque from steering actuator 24 to pinion gear 34 without slippage occurring within variable coupling member 26 when only steering actuator 24 is used to position rack 36, however, slippage within variable coupling member 26 is allowed to occur if the operator of autonomous vehicle 12 applies a sufficient torque to steering wheel 18, thereby allowing the operator of autonomous vehicle 12 to overpower steering actuator 24 if deemed necessary by the operator of autonomous vehicle 12. FIG. 3 includes three torque transfer arrows 42 to illustrate this capability of transferring this magnitude of torque through variable coupling member 26 where the magnitude of torque that is able to be transferred through variable coupling member 26 may be greater than in the manual mode of operation as shown in FIG. 2. However, it should now be understood that the magnitude of torque that is able to be transferred through variable coupling member 26 in the manual mode of operation may be greater than the magnitude of torque of torque that is able to be transferred through variable coupling member 26 in the first autonomous mode of operation. It should be noted that in the first autonomous mode of operation, steering wheel 18 is back-driven through steering shaft 22, however, due to the low rate of rotation of steering shaft 22 and the low magnitude of angular movement of steering shaft 22, risk to the operator of autonomous vehicle 12 is low even if the operator of autonomous vehicle 12 is in contact with steering wheel 18 when steering wheel 18 rotates as a result of steering actuator 24 moving rack 36.

Figure 4:
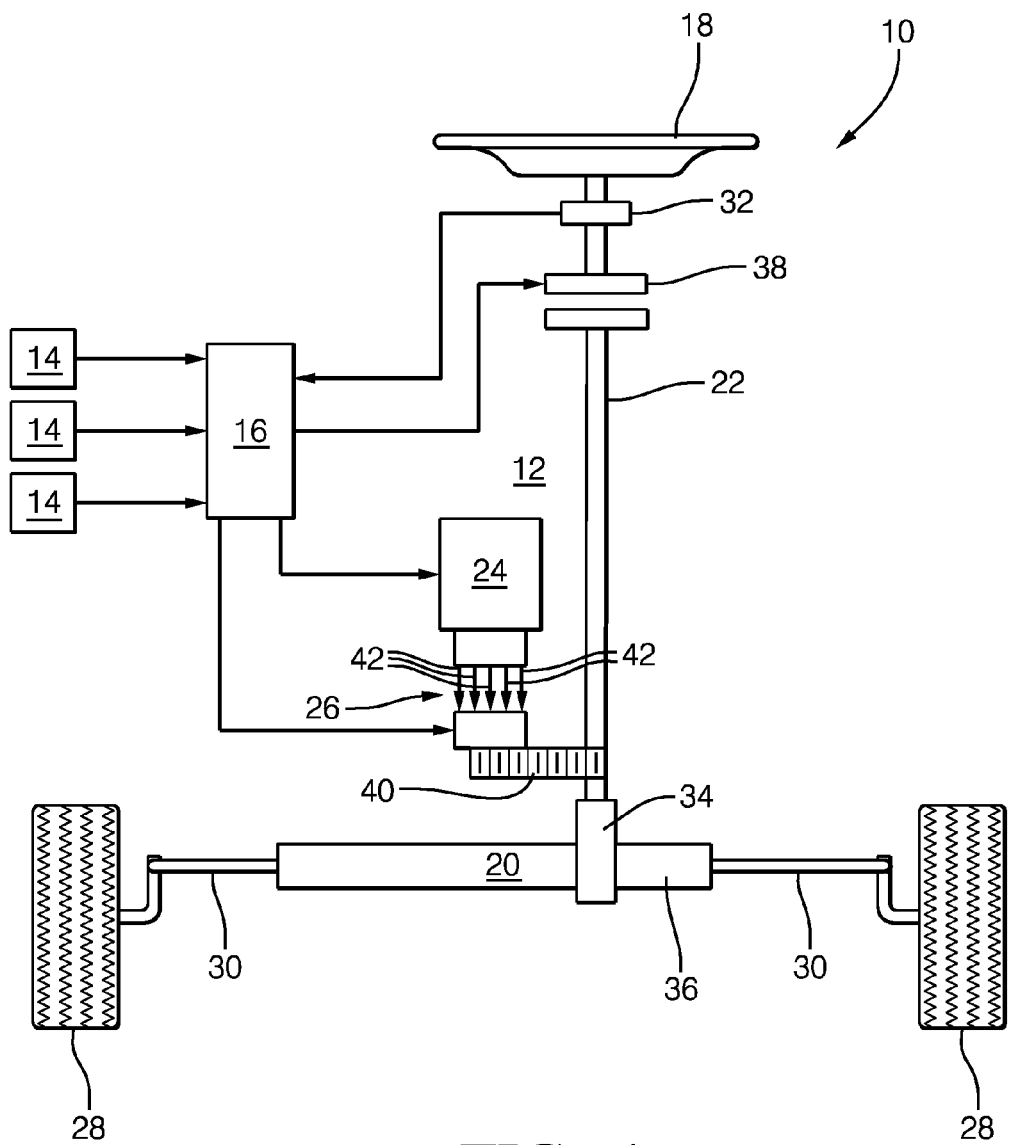
FIG. 4 is the schematic view of FIG. 1 showing the steering system in a second autonomous mode of operation.

Now with reference to FIG. 4, a second autonomous mode of operation of steering system 10 is shown. In the second autonomous mode of operation, autonomous driving ECU 16 is primarily responsible for steering autonomous vehicle 12 where the rate of rotation of steering shaft 22, the magnitude of angular movement of steering shaft 22, and the torque required from steering actuator 24 to position rack 36 is relatively high. This condition may exist, by way of non-limited example only, when autonomous vehicle 12 is being operated by autonomous driving ECU 16 to navigate autonomous vehicle 12 to a parking spot or to perform an evasive maneuver in order to avoid an obstacle. In the second autonomous mode of operation, autonomous driving ECU 16 commands clutch 38 to be disengaged, thereby rotationally decoupling steering wheel 18 from pinion gear 34. Also in the second autonomous mode of operation, autonomous driving ECU 16 commands steering actuator 24 to position rack 36 as determined necessary by autonomous driving ECU 16 based on input devices 14. Also in the second autonomous mode of operation, autonomous driving ECU 16 commands variable coupling member 26 to be capable of transmitting a magnitude of torque from steering actuator 24 to pinion gear 34 without slippage occurring within variable coupling member 26. FIG. 4 includes five torque transfer arrows 42 to illustrate this capability of transferring this magnitude of torque through variable coupling member 26 where the magnitude of torque that is able to be transferred through variable coupling member 26 may be greater than in the first autonomous mode of operation as shown in FIG. 3 in order to ensure that no slippage within variable coupling member 26 at the increased torque output of steering actuator 24 during parking and evasive maneuvers. While the second autonomous mode of operation has been described as disengaging clutch 38, it should now be understood that clutch 38 may be engaged in the second autonomous mode of operation if a determination is made, for example by one or more of input devices 14, that the operator is not contacting steering wheel 18.

When switching between the manual mode of operation, the first autonomous mode of operation, and the second autonomous mode of operation, variable coupling member 26 is adjusted to increase or decrease the torque that can be transmitted from steering actuator 24 to rack and pinion steering gear 20 to accommodate the mode of operation to which steering system 10 is being transitioned. Furthermore, varying the torque that can be transmitted from steering actuator 24 to rack and pinion steering gear 20 can be based on an actual or anticipated switching of mode of operation or based on an actual or anticipated coupling or decupling of steering wheel 18 and pinion gear 34.

Variable coupling member 26 together with clutch 38 allows various operating modes of steering system 10 to be carried out in response to a variety of driving scenarios. Variable coupling member 26 together with clutch 38 also allows the operator of autonomous vehicle 12 to regain control over steering actuator 24 under appropriate conditions while also minimizing risk to the operator of autonomous vehicle 12 when steering maneuvers carried out by steering actuator 24 would otherwise back-drive steering wheel 18 at a high rate of rotation over a large angular range.

While this invention has been described in terms of preferred embodiments thereof, it is not intended to be so limited, but rather only to the extent set forth in the claims that follow.

We claim:

1. A steering system for an autonomous vehicle, said steering system comprising:
   a steering mechanism having a steering mechanism input member and a steering mechanism output member, said steering mechanism being configured to translate rotation of said steering mechanism input member into movement of said steering mechanism output member which is configured to affect the position of a steer tire of said autonomous vehicle, thereby affecting the lateral position of said autonomous vehicle;
   a steering wheel which provides a mechanical input to said steering mechanism input member from an operator of said autonomous vehicle;
   a steering actuator which rotates to apply torque to said steering mechanism, thereby inducing movement of said steering mechanism output member which affects the position of said steer tire of said autonomous vehicle; and
   a variable coupling member operatively between said steering actuator and said steering mechanism which is configured to vary the torque that can be transmitted from said steering actuator to said steering mechanism.

2. A steering system as in claim 1 further comprising:
   an autonomous driving electronic control unit; and
   an input device which provides navigational input data to said autonomous driving electronic control unit;
   wherein said autonomous driving electronic control unit is configured to process said navigational input data to generate navigational output data which is transmitted to said steering actuator and to said variable coupling member, thereby rotating said steering actuator and varying the torque that can be transmitted from said steering actuator to said steering mechanism.

3. A steering system as in claim 1 wherein said steering mechanism is a rack and pinion steering gear.

4. A steering system as in claim 3 wherein said steering mechanism input member is a pinion gear and said steering mechanism output member is a rack.

5. A steering system as in claim 1 wherein said variable coupling member is a magnetorheological fluid coupling.

6. A steering system as in claim 1 further comprising a means for selectively coupling and decoupling said steering wheel from said steering mechanism input member.

7. A steering system as in claim 6 further comprising:
   an autonomous driving electronic control unit; and
   an input device which provides navigational input data to said autonomous driving electronic control unit;
   wherein said autonomous driving electronic control unit is configured to process said navigational input data to generate navigational output data which is transmitted to said steering actuator, said variable coupling member, and said means for selectively coupling and decoupling said steering wheel from said steering mechanism input member, thereby rotating said steering actuator, varying the torque that can be transmitted from said steering actuator to said steering mechanism, and coupling and decoupling said steering wheel from said steering mechanism input member as determined necessary.

8. A method for operating a steering system for an autonomous vehicle where said steering system includes a steering mechanism having a steering mechanism input member and a steering mechanism output member, said steering mechanism being configured to translate rotation of said steering mechanism input member into movement of said steering mechanism output member which is configured to affect the position of a steer tire of said autonomous vehicle, thereby affecting the lateral position of said autonomous vehicle; a steering wheel which provides a mechanical input to said steering mechanism input member from an operator of said autonomous vehicle; a steering actuator which rotates to apply torque to said steering mechanism, thereby inducing movement of said steering mechanism output member which affects the position of said steer tire of said autonomous vehicle; and a variable coupling member operatively between said steering actuator and said steering mechanism, said method comprising:
   adjusting said variable coupling member to vary the torque that can be transmitted from said steering actuator to said steering mechanism.

9. A method as in claim 8 wherein said steering system also includes an autonomous driving electronic control unit and an input device which provides navigational input data to said autonomous driving electronic control unit, said method further comprising:

using said autonomous driving electronic control unit to process said navigational input data to generate navigational output data which is transmitted to said steering actuator;

using said navigational output data to rotate said steering actuator; and using said navigational output data to vary the torque that can be transmitted from said steering actuator to said steering mechanism.

10. A method as in claim 8 further comprising coupling and decoupling said steering wheel from said steering mechanism input member.

11. A method as in claim 8, said method further comprising:

providing navigational input data to an autonomous driving electronic control unit of said steering system;

using said autonomous driving electronic control unit to process said navigational input data to generate navigational output data;

using said navigational output data to rotate said steering actuator;

using said navigational output data to vary the torque that can be transmitted from said steering actuator to said steering mechanism; and using said navigational output data to couple and decouple said steering wheel from said steering mechanism input member.

12. A method as in claim 8 further comprising:

decoupling said steering wheel from said steering mechanism input member; and adjusting said variable coupling member to increase the torque that can be transmitted from said steering actuator to said steering mechanism based on an actual or expected decoupling of said steering wheel from said steering mechanism input member.

13. A method as in claim 8 further comprising:

coupling said steering wheel to said steering mechanism input member; and adjusting said variable coupling member to decrease the torque that can be transmitted from said steering actuator to said steering mechanism based on an actual or expected coupling of said steering wheel to said steering mechanism input member.

14. A method as in claim 8 further comprising:

switching said steering system from a manual mode of operation where said operator of said autonomous vehicle controls the lateral direction of said autonomous vehicle through said steering wheel to an autonomous mode of operation where an autonomous driving electronic control module is primarily responsible for the lateral direction of said autonomous vehicle; and varying the torque that can be transmitted from said steering actuator to said steering mechanism based on an actual or expected switching from said manual mode of operation to said autonomous mode of operation.

15. A method as in claim 8 further comprising:

switching said steering system from an autonomous mode of operation where an autonomous driving electronic control module is primarily responsible for the lateral direction of said autonomous vehicle to a manual mode of operation where said operator of said autonomous vehicle controls the lateral direction of said autonomous vehicle through said steering wheel; and varying the torque that can be transmitted from said steering actuator to said steering mechanism based on an actual or expected switching from said autonomous mode of operation to said manual mode of operation.

16. A method as in claim 15 wherein said step of varying the torque that can be transmitted from said steering actuator to said steering mechanism includes setting the torque that can be transmitted from said steering actuator to said steering mechanism to a magnitude that can be overcome by said operator of said autonomous vehicle through said steering wheel.

* * * * *